United States Patent [19]
Del Pico

[11] 3,762,566
[45] Oct. 2, 1973

[54] SUPPORTED SEMIPERMEABLE MEMBRANES AND PROCESS FOR PREPARING SAME
[75] Inventor: Joseph Del Pico, Cambridge, Mass.
[73] Assignee: Abcon, Inc., Cambridge, Mass.
[22] Filed: Aug. 3, 1971
[21] Appl. No.: 168,735

[52] U.S. Cl. ............... 210/490, 210/500, 264/41
[51] Int. Cl. ............................................. B01d 31/00
[58] Field of Search ................. 210/22, 23, 490, 210/491, 500; 264/41, 49

[56] References Cited
UNITED STATES PATENTS

| 1,720,670 | 7/1929 | Duclaux | 210/500 X |
| 3,429,957 | 2/1969 | Merten | 210/500 X |
| 3,544,358 | 12/1970 | Manjikian | 210/490 X |
| 3,494,470 | 2/1970 | Banfield | 210/490 X |
| 3,648,845 | 3/1972 | Riley | 210/490 |
| 3,556,305 | 1/1971 | Shorr | 210/500 X |

Primary Examiner—Frank A. Spear, Jr.
Attorney—Richard P. Crowley et al.

[57] ABSTRACT

A supported semipermeable membrane suitable for use in ultrafiltration and reverse osmosis separations, and a method for preparing such membranes which comprises impregnating the surface of a porous support prior to casting onto the surface a thin film of a casting solution, the surface of the porous support impregnated with a nonsolvent for the film-forming material in the casting solution, thereby providing an integral-supported semipermeable membrane of predetermined flux and rejection rates.

21 Claims, No Drawings

SUPPORTED SEMIPERMEABLE MEMBRANES AND PROCESS FOR PREPARING SAME

BACKGROUND OF THE INVENTION

Supported semipermeable membranes, particularly in tubular form, have been employed in a number of reverse osmosis high-pressure and ultrafiltration low-pressure separatory processes. Typically, the nature of the support tubes varies, depending upon the particular process in which the semipermeable membrane is to be employed, such as, for example, employing a rigid porous support of resin-reinforced glass fibers for reverse osmosis processes, and a rigid porous sintered resin support tube for ultrafiltration processes (see U.S. Pats. Nos. 3,457,170 and 3,547,272).

In some cases, semipermeable membranes are prepared from the casting solution wherein the membranes so prepared are then inserted into the support tube, or the casting solution may be cast directly onto the interior walls of the support tube. In practice, the casting solution generally comprises a film-forming polymer, such as cellulose acetate, selected for its membrane characteristics, a solvent for the polymer, such as a volatile organic solvent like ketones, acetates, alcohols, for example, acetone, and, optionally, a nonsolvent for the polymer, such as water or formamide, and, optionally, a pore-producing agent, such as a water-soluble leachable salt, such as a perchlorate like magnesium perchlorate. In the past, considerable attention has been focused on the apparatus used for casting and on the particular casting conditions employed in the process in order to obtain a semipermeable membrane having the desirable flux rate and selectivity properties. The semipermeable membrane properties have been obtained in general by controlling the concentration of the polymer in the casting solution, the time and temperature of casting and evaporating, the temperature of immersion of the cast membrane into a leaching bath and the temperature to which the subsequently gelled leached films are heated. Typical U.S. patents discussing the preparation of semipermeable membranes and the process employed for controlling the characteristics of the membranes are U.S. Pats. Nos. 3,133,132, 3,412,184, 3,439,074, 3,444,286 and 3,542,908.

In preparing supported tubular cast semipermeable membranes, a thin layer of a casting solution is cast onto the interior of the support tube with the aid of a casting bob, and the solvent permitted to evaporate on the surface of the cast layer, and, thereafter, depending upon the desired properties of the semipermeable membrane, the support tube and cast gelled membrane are immersed in a leaching bath of a nonsolvent, typically, water. It has been reported that the resulting semipermeable membrane formed comprises a very thin compact consolidated or active layer on the evaporative surface thereof, which is supported by a spongy underlayer. The selectivity property of the semipermeable membrane or the rejection rate of the membrane in the permeation process has been attributed to this active layer which constitutes only a very small portion of the film and is formed only by and conditioned on the evaporative conditions in the drying of the cast layer. It has been reported that the remainder of the semipermeable membrane film, the spongy underlayer, makes up over 99.5 percent of the total film layer and provides substantially no effect on the rejection rate or selectivity properties of the semipermeable membrane so formed, but rather, is directed to controlling the flux rate of the membrane. The evaporation rate from the surface of the cast membrane is typically controlled by blowing a drying gas over the surface immediately after casting (see U.S. Pats. Nos. 3,524,757, 3,527,853, and 3,567,810). In some cases, it is desirable to maintain a solvent-saturated atmosphere above the cast film in order to control evaporation of the solvent, and by this manner, avoid the criticality of the time period between casting the thin film and immersing the thin film into the leaching bath (see U.S. Pat. No. 3,432,585).

Further, it has been proposed in U.S. Pat. No. 3,580,841 to prepare particular ultrathin semipermeable membranes by casting a concentrated polymer solution on a liquid surface, such as on water, and then laminating the membrane so prepared onto a separate porous support to form a composite membrane suitable for use in a reverse osmosis process. Such a technique has been reported to provide membranes of between 1,500 to 2,500 angstroms in thickness.

Accordingly, there are a number of techniques and conditions for preparing supported semipermeable membranes, and it would be desirable to provide for the production of semipermeable membranes in a reproducible continuous manner, whereby the semipermeable membranes would be controlled, both in flux rate and in selectivity properties or rejection rate, either in combination or independently.

SUMMARY OF THE INVENTION

My invention concerns a method for preparing supported semipermeable membranes useful both in ultrafiltration and reverse osmosis separatory processes, and to the treatment of the support therefore, and to the supported semipermeable membranes so prepared. In particular, my invention relates to the preparation of porous tubular supported semipermeable membranes, the membranes so prepared, and which membranes are characterized by predetermined flux and rejection rate properties. More particularly, my invention comprises the method of preparing porous sintered resin tubular supported semipermeable membranes suitable for use in ultrafiltration processes, and having predetermined flux and rejection rates, and to the membranes so prepared. My method comprises the selection of the conditions of impregnating a porous support with a nonsolvent prior to casting a thin film of a casting solution thereon, and heating the support to obtain the desired balance of flux rate and rejection rate properties.

My invention comprises an improved method for preparing a cast semipermeable membrane on a porous support. Such method includes providing a membrane-casting composition containing a filmforming polymer and a solvent for the polymer, typically a volatile organic solvent, such as a ketone or alcohol or mixture thereof, providing a porous support for the semipermeable membrane, such as a porous sintered resin surface or a porous resinreinforced braided or knitted fiber glass surface; casting a thin film by the use of a casting solution and a casting bob for the interior surface of a tubular support or a casting knife for casting on a planar surface; evaporating at least a portion of the volatile solvent from the cast film layer to form a membrane film having an active layer on the surface thereof, the evaporation, if desired, carried out under controlled evaporation conditions; and, thereafter, gelling the film-forming cast layer, such as by immersing the support tube and cast film in a water bath at a temperature of from about 0 to 20°C to provide an integral-supported semipermeable membrane characterized by an active layer on a porous substrate, and in which my improvement comprises: impregnating the surface of the porous support prior to casting the thin film thereon with a non-solvent for the film-forming membrane material, thereby providing an integral-supported semipermeable membrane containing a predetermined flux and rejection rate. It is essential in my invention that impregnation occur prior to the casting step in order to provide the benefits and advantages set forth herein. The non-solvent used to impregnate may be the same or different nonsolvent used in the casting solution, or be a mixture of nonsolvents, depending on the membrane-flux properties desired. Water and water-alcohol; i.e., water glycol, mixtures are preferred.

In a further embodiment of my invention, my invention comprises the improvement of heating the porous support prior to or contemporaneously with the casting of a thin film on the casting composition thereon to a desired temperature in order to control the evaporation rate of the solvent from the cast layer, thereby providing an integral-supported semipermeable membrane having a predetermined thickness of the active layer and a predetermined selectivity or rejection rate. Furthermore, in a particularly preferred embodiment of my invention, my invention comprises the improvement of both impregnating with a nonsolvent, such as water, the surface of a porous support prior to casting a thin film thereon, in combination with heating the porous support, such as by employing a heated nonsolvent to impregnate the surface of the porous support prior to casting a thin film thereon, thereby providing a unique integral-supported semipermeable membrane in which both control of the flux and selectivity properties of the membrane are obtained. My method is particularly adapted for the continuous production of integral-supported semipermeable membranes of high and reproducible quality, while the membranes so produced are unique in their combination of flux and rejection rates over those supported semipermeable membranes produced in the past.

I have found that at least one process variable, and preferably two process variables should be controlled when producing my supported semipermeable membranes. One process variable is to cast the casting solution upon a porous support, the surface of which has been impregnated with a nonsolvent, such as water. The other condition is to impart thermal energy to the porous support prior to casting so as to increase the evaporation rate of the volatile solvents in the film-casting solution, thereby, in combination, providing a unique supported semipermeable membrane. I have discovered that impregnating the porous support, such as by saturating with water prior to casting at an ambient temperature of, for example, 15° to 30°C with a nonsolvent prior to casting, provides for increased flux rate of the membrane so prepared, whereas impregnating the porous support with a non-solvent at an increased temperature, for example, water at a temperature of 35° to 95°C, such as 50° to 85°C, increases and controls both the flux rate and the rejection rate of the integralsupported semipermeable membrane.

In the course of producing supported semipermeable membranes, particularly tubular supported semipermeable membranes, cast onto a porous support backing, I have discovered that the condition of the backing affects in a surprising and unexpected manner the flux characteristics of the resulting membrane. The effects observed, I believe, can be explained in terms of the particular gelling of the asymmetric membrane spongy underlayer in the visual solvent-nonsolvent environment. Although not wishing to be bound by any particular theory of operation, I have observed that membranes which are cast on support tubes stored in a low relative humidity environment; that is, a low nonsolvent, for example, under 40% relative humidity, have fluxes lower than those cast on a solution of the same composition and under the same conditions on support tubes which were stored in a relatively high relative humidity environment, such as 50 to 90 percent or under relative humidity saturated conditions. For example, I have found that membranes cast using a solution of 2 grams of cellulose acetate, 7 ml of dioxane and 2 ml of formamide onto a porous sintered polyethylene support tube backing which has been stored under dry humidity conditions (under 30 percent relative humidity) prior to casting had water flux rates of approximately 35 gallons per square foot per day (gfd) at a pressure of 50 pounds psi, and showed a rejection rate of 88 percent when tested with a 1 percent Carbowax 20M solution at 50 psi at a temperature of 25°C, and a Reynolds number of 49,000. However, I observed and found that membranes cast using the same solution under the same conditions but on the same backing but having the backing stored in a relatively high humidity environment (over 50 percent relative humidity) exhibited flux rates of approximately 60 gfd with approximately the same rejection rate.

Although not wishing to be bound by any theory as to the mechanism by which my improved process and membranes are prepared, it is postulated that the diffusion of the nonsolvent present in the porous backing into the underside of the cast ungelled membrane layer provides for a more porous spongy underlayer, providing a higher more desirable flux rate. For example, it is believed that as the nonsolvent concentration increases in the membrane, the film-forming polymer precipitates or gells, but because a solvent is still present in the layer, the structure so formed by evaporation under the active layer is open and highly porous, permitting a high flux rate. Since the process of diffusion is a slow process, the solvent still evaporates in the upper membrane surface with the consequent formation of a desired active layer which provides for the desired rejection rate. My data has shown the rejection rate or selectivity of the resulting active layer to be unaffected by the nonsolvent content for the backing, and, accordingly, it appears that the rejection, based on the active layer, is being formed in the usual way; that is, by the evaporation conditions of the surface of the cast layer. It is believed that water or other nonsolvents from the porous support tube fuses into the underside of the cast ungelled membrane layer, whereby a unique understructure is formed which is open and highly porous; that is, it provides a membrane having a substantially higher flux rate than those normally provided, based on normal evaporation or prior art techniques. As used herein, the term, "rejection rate", is intended to refer to the property of a semipermeable membrane to prevent the passage of certain materials on the basis of molecular weight, size and configuration, while permitting the passage of other materials.

In one particularly preferred embodiment of my invention, a heated nonsolvent, such as water, is permitted to impregnate the casting surface of a tubular support, and after the surface of the porous support is saturated with the heated water, the casting solution is cast thereon. The nonsolvent impregnating the porous support is believed to inhibit and prevent the formation of an active evaporative layer within the porous support, while permitting the formation of the usual active evaporative layer on the surface of the cast film. Further, the nonsolvent in the porous support diffuses into the underlayer of the cast membrane, permitting formation of a semipermeable membrane having a substantially higher flux rate. Further, the employment of a heated nonsolvent permits thermal energy to be transferred to the tubular support, which energy is transmitted through the cast membrane, and provides aid in the rapid evaporation of the solvent from the surface of the cast membrane film, thereby forming an active layer of particularly desirable properties as relates to a high rejection rate. This unique combination of process conditions results in the formation of an integral, unique supported semipermeable membrane in which both flux rate and rejection rate may be independently controlled as desired.

In the preferred operation of my invention, a porous support tube, such as a sintered resin support tube, is soaked in a nonsolvent, such as water, thereby impregnating the interior surface thereof; that is, the interstitial area between the resin particles with water prior to casting a casting solution in a thin film thereon. In this manner, an integral-supported tubular semipermeable membrane is prepared typically having a flux rate of greater than 50 gfd and a rejection rate of greater than 94 percent with a 1 percent solution of Carbowax 20M. In another embodiment of my invention, a support tube is heated, and immediately thereafter, a thin film of the casting solution cast thereon, thereby providing a hot; for example, 50° to 80°C, dry porous support tube prior to casting, and, thereafter, providing for an integral-supported semipermeable membrane having a low flux rate of about 10 to 30 gfd; for example, 20 gfd, with an accompanying high rejection rate of about 94 percent or greater of a 1 percent solution of Carbowax 20M. The increased available thermal energy from the porous support tube is believed to permit a greater rate of solvent removal by evaporation from the formation of the active layer, resulting in a high rejection, or the dry backing allows for the solvent loss into the backing, causing the membrane structure; that is, the membrane underlayer adjacent to the backing to be less porous and open in nature. The support may be heated in any manner and to any desired temperature, such as by the use of a radiant heater, placing the support in an oven prior to casting, or by subjecting the support to a hot gaseous stream. After casting, control of the atmosphere or blowing a dry gas over the cast film as in the prior art may be employed.

Accordingly, in one preferred embodiment of my invention, a unique supported membrane may be prepared by casting a hot non-solvent impregnated wet porous support backing tube in a casting solution in order to obtain, such as by pumping hot water, for example, from 60° to 80°C, through a porous polyethylene sintered resin support tube so that the temperature of the partially impregnating support tube became approximately that of the pump water, and, thereafter, casting a thin film onto the water-impregnated heated surface, thereby providing a supported membrane having a flux rate of greater than 50 gfd and a rejection of greater than 94 percent.

My invention will be described in particular in connection with the preparation of a sintered resin porous support tube having a cellulose acetate thin membrane layer formed thereon; however, this is for the purpose of illustration only. It is recognized that the porous support backing may constitute a wide variety of materials, such as, for example, sintered resins, such as thermoplastic sintered resins like olefinic resins, such as polypropylene and polyethylene, as well as porous resin-impregnated wound fibrous, woven or nonwoven support tubes or backing, such as wound or braided fiberglass-hardened resin porous support tubes employed in reverse osmosis processes. The porosity nature of the porous support should be such as to permit the retention of the nonsolvent impregnated in the surface on which the thin film of the casting solution is to be cast; that is, the porous support must be capable of retaining in its interstices a nonsolvent; e.g., 5 to 500 microns. Further, my invention will be described in particular in connection with the preparation of a tubular supported semipermeable membrane; however, it is recognized that the particular form of the supported porous backing may vary.

Furthermore, my invention will be illustrated with the employment of a cellulose acetate casting composition; however, it is further recognized that the particular form of the film-forming polymer to be employed as a membrane may vary as desired, but cellulose esters and cellulose ethers and regenerated cellulose, acrylics, olefin resins, polyamides and the like, nylon and those film-forming polymers normally employed as semipermeable membranes are the preferred film-forming polymers.

The term, "nonsolvent", as used herein is intended to refer to a nonsolvent material, particularly a material on which the film-forming polymer employed as the semipermeable membrane in the casting solution is not soluble, but which may be miscible with the polymeric casting solution. Typical nonsolvents other than water, which is the preferred nonsolvent, may include a variety of materials, including hydrocarbon, such as chlorinated aliphatic hydrocarbons, alcohol, such as mono and polyhydric alcohol to include glycerols or polyglycols, as well as aliphatic nitrogen compounds, such as formamide and the like. The selection of the particular nonsolvent to be employed depends on the particular polymer used as the membrane material.

In my preferred embodiment, the nonsolvent, particularly heated to a desired temperature, is contacted with the porous support prior to casting the thin film thereon. The particular temperature of the nonsolvent to be employed may vary, depending upon the need to impart thermal energy to the porous support. Typically, where water is employed as the nonsolvent, the water may be heated to a temperature of from 30° to 90°C, with the particular temperature varying, depending on the properties of the membrane to be prepared and the nonsolvent and solvent used. Although the heating of the porous support is, in the described embodiment, occasioned by the heating of the nonsolvent, it is also recognized that the porous support may be separately heated simultaneously with the impregnating of the nonsolvent, or separately or directly with or after the casting of the casting solution in a thin layer thereon. For example, the porous support may be separately heated employing dielectric or radiant heat or by the employment of a hot drying gas or other techniques.

The tubular supported membranes prepared by my process are particularly useful when they have high flux rates (200 gfd) and high rejection rates (over 98 percent Carbowax 20M) in ultrafiltration low-pressure processes; that is, the separatory processes employing pressures of less than about 200 psi, for example, in the separation of whey solutions into a protein fraction and a lactose fraction, or the separation of electrocoating paint solutions into a paint fraction and a salt fraction. For example, employed in an ultrafiltration process at 10 psi, my membranes may be adapted to pass 90 percent or more of the protein material, trypsin, of about 25,000 molecular weight, while retaining about 98 percent of a protein of 45,000 molecular weight, or, for example, rejecting 99+ percent of a dextrin yellow with a mean average molecular weight of 20,000, or rejecting, for example, 87 percent or more of a 15,000 average mean molecular weight of a polyethylene glycol.

Impregnation of at least the surface of a porous support may be accomplished by a number of techniques. The relative degree of impregnation of the surface with the nonsolvent may vary, such as, for example, wherein only the immediate surface on which the casting solution is cast may be impregnated, or, for example, where approximately the entire porous backing is saturated with the nonsolvent, or where approximately only a portion of the backing is impregnated. Of course, where desired, one or a number of nonsolvents, alone or in combination, may be employed to accomplish the impregnation. The preferred method is merely to pump the nonsolvent through a porous support tube until the porous support tube's interior surface is impregnated, and in this manner, it is preferable that the recycling of the discharged nonsolvent back to the pump be accomplished. Impregnation of the porous support may also be accomplished by storing the porous support tube, for example, in an environment, such as an atmosphere saturated with or rich in a nonsolvent, for example, having a relative humidity in the case of water of typically over 50 to 90 percent, whereby the porous support becomes in time; e.g., 1 to 24 hours, impregnated with the nonsolvent in the atmosphere. Impregnation may also occur by immersing the porous support tubes in a bath of a nonsolvent until just prior to use.

Where desired, the prior art technique of blowing a dry gas; for example, air, over the cast membrane immediately after casting may be employed in order to obtain the desired semipermeable membrane rejection rate. Such prior art posttreatment of the cast membrane, in order to increase the rejection rate of the resulting membrane, is observed to sacrifice only partially the gain in flux rate occasioned by casting the membrane onto a nonsolvent-impregnated porous support. In my invention, any combination of the foregong conditions may be employed to produce the active layer or tighter skin of the semipermeable membrane, while maintaining the substructure of the cast membrane in an open or porous condition without the formation of a separate second active layer of skin generally at the interface of the surface of the porous support, or to prevent or inhibit the compacting of the sub-surface of the active layer of the cast membrane film. As described, the porosity of the porous support can be imparted to the support by any number of methods, so long as the tube is characterized by a relatively open substantial number of interconnected small interstices. These connected interstices may be produced with the use of a rigid open-cell foam material wherein a large percentage of the cells are interconnected, or by sintering techniques to produce a porous sintered resin by impregnating a support material with a resin and subsequently hardening the resin, but using insufficient resin so that there is a porous interconnected structure to permit the passage of a liquid material. Typical porous support structures may also employ sintered resin or metal particles, like stainless steel, and the porous support may be in any configuration, such as flat, spiral, wound, tubular and the like.

DESCRIPTION OF THE EMBODIMENTS

A series of experiments were conducted employing varying process conditions in connection with the preparation of a supported tubular semipermeable membrane. First, a membrane-casting composition comprising a solution of about 2 grams of a cellulose acetate (a film-forming membrane material), 7 ml of dioxane, a solvent for the film-forming polymer, and 2 ml of formamide, a nonsolvent for the film-forming polymer was prepared. A thin layer of the casting solution was then cast on the inner surface of a sintered polyethylene porous tubular support, the tube comprising a length of about 10 feet, one inch inside diameter, one-and-a-half inch outside diameter, and having an average pore size of approximately 10 to 300 microns; for example, 20 to 100 microns. A thin cast membrane film was formed in the interior wall of the sintered polyethylene tubes employing a casting bob, the film having a dimension of between 20/1000 to 30/1000 of an inch. Immediately after casting, the films were leached in a water bath for approximately 10 minutes at 20°C. The casting operation occurred in a room having a temperature of approximately 19° to 22°C and with a relative humidity of between 30 and 55 percent. After perforation, the integral-supported semipermeable membranes so prepared were tested for flux rate and rejection rate properties by employing a 1 percent by weight Carbowax 20M water solution, which solution was passed through the interior of the supported tubular membrane at about 50 psi, 25°C, and a Reynolds number of approximately 49,000. (Carbowax 20M is a trademark of Union Carbide Corporation for polyethylene glycols, and methoxy polyethylene glycols of about 200 to 20,000 molecular weight, while Carbowax M is a polyethylene glycol having an average molecular weight of approximately 18,000).

A series of experiments were conducted by pretreating the porous support tubes illustrated in Table I with the resulting flux rates and rejection rates shown.

TABLE I

| | Support Tube Pretreatment | Flux* (cc/min) | Rejection Percentage |
|---|---|---|---|
| Example 1 | None | 166 | 82.4 |
| Example 2 | Heated in an oven at 58°C | 202 | 91.8 |
| Example 3 | Immersed in a water bath of 45°C for 6 minutes | 554 | 88.9 |
| Example 4 | Water pumped through the porous support tube at temperature of 74°C for approximately 2 minutes | 351 | 95.1 |

*Membrane surface area 2.2 ft.

As illustrated, the integral-supported membrane prepared, as in Examples 3 and 4, exhibited a substantially higher flux rate than those prepared in Examples 1 and 2, and higher rejection rates. The pretreatment of the porous support tube by impregnating the tube through contact with heated water is believed to prevent the rapid diffusion of the solvent from the cast film into the porous support base, and to permit the diffusion of the nonsolvent into the porous support, thereby providing an open porous understructure and a high flux rate as shown. The rapid diffusion of the nonsolvent into the underside of the cast film, maintained relative to the outward solvent diffusion by evaporation, results in the cast film being gelled in a highly porous state. The employment of heated water imparts thermal energy and enhances the rapid formation of the active layer in the internal surface of the tube, resulting in an asymmetric membrane having a high rejection rate.

In Example 1, two active layers are, in fact, formed, one at the interface of the cast film and the porous support tube, and the other at the exposed surface of the cast membrane, these layers same as the porous inner layer. In Example 2, the membrane was cast on a heated dry porous support tube, and again, two active inner and outer layers were formed. The layers are believed to be thicker than those in Example 1, due to the more rapid transport; that is, the high evaporation rate of the solvent from the cast membrane film. The higher temperature conditions and rapid evaporation, therefore, resulted in the higher rejection rate and flux as shown than in Example 1. Examples 3 and 4 showed significantly higher flux rates and good rejection rates and with a high rejection rate as in Example 4 where the nonsolvent, water, heated the porous support tube to a higher temperature.

Accordingly, my invention requires, in its preferred embodiment and as an essential element to the preparation of a very unique supported tubular membrane, the impregnation of the porous support prior to casting a thin film of the casting solution thereon, along or in combination with heating the porous support prior to casting.

I claim:

1. In a method for preparing a semipermeable membrane on a porous support, which method comprises: providing a membrane-casting composition containing a film-forming polymer and a solvent for the polymer; providing a porous support for the semipermeable membrane; casting a thin film of the casting solution onto the surface of the porous support; evaporating at least a portion of the solvent in the casting solution to form a membrane film, having an active layer on the surface thereof; and gelling the film-forming polymer to provide a supported semipermeable membrane characterized by an active layer and a porous substrate, the improvement which comprises:
impregnating the surface of the porous support prior to casting the thin film thereon with a solution containing formamide to provide an integral-supported semipermeable membrane of a predetermined flux and rejection rate.

2. The method of claim 1 which includes impregnating the surface of the porous support by storing the porous support in an atmosphere rich in formamide.

3. The method of claim 1 which includes impregnating by flowing the formamide solution across the surface of the porous support.

4. The method of claim 1 which includes impregnating the porous support by placing the porous support prior to use in a solution containing formamide.

5. The method of claim 1 which includes providing a porous support tube, and impregnating the interior surface of the porous tubular support with the formamide prior to casting a thin film of the casting composition thereon.

6. The method of claim 1 which includes impregnating substantially completely the porous support.

7. The method of claim 1 which includes heating the porous support prior to casting a thin film casting solution thereon, thereby providing a supported semipermeable membrane, having a predetermined rejection rate.

8. The method of claim 1 which includes evaporating at least a portion of the solvent from the casting solution by flowing a dry heated gas over the surface of the cast membrane.

9. The method of claim 1 which includes providing as the porous support a porous tube having an average pore size of from 10 to 300 microns.

10. The method of claim 1 which includes providing a porous support tube, and impregnating the porous support tube by pumping formamide heated to a temperature of from about 30 to 90°C through the tubular support for a period of time to impregnate the interior surface of the porous tube prior to casting a thin film of the casting solution onto the interior surface.

11. The method of claim 1 which includes providing as the membrane-casting composition a solution of dioxane and formamide with the film-forming material cellulose acetate.

12. A supported semipermeable membrane prepared by the process of claim 1.

13. The method of claim 1 wherein the porous support is a porous resin-hardened fibrous tube.

14. The method of claim 13 wherein the fibrous tube is a braided glass-fiber tube.

15. The method of claim 1 wherein the solution containing formamide is formamide.

16. In a method for preparing a porous tubular supported semipermeable membrane, which method comprises: providing a membrane-casting solution comprising a solution of cellulose acetate in dioxane and formamide; providing a porous support tube; casting a thin film of the casting composition onto the interior surface of the tubular support; evaporating at least a portion of the solvent from the casting composition to form a semipermeable membrane having an active layer thereon; and gelling the film-forming material to form a semipermeable membrane characterized by an active layer and a porous substrate, the improvement which comprises:
immersing the support tube in formamide prior to the casting step to impregnate the interior surface of the porous support tube with formamide.

17. The method of claim 16 which includes impregnating the surface of the porous tube with the formamide at a temperature of from about 15° to 30°C.

18. The method of claim 16 which includes providing a porous support tube of a sintered resin.

19. The method of claim 16 which includes evaporating at least a portion of the solvent from the casting composition by flowing a dry gas through the interior of the porous tubular support tube.

20. A tubular supported semipermeable membrane produced by the process of claim 16.

21. The method of claim 16 which includes providing a porous support of a resin-reinforced braided glass-fiber tube.

* * * * *